J. F. LOREMAN.
TONGS.
APPLICATION FILED NOV. 28, 1910.
1,009,760.
Patented Nov. 28, 1911.
2 SHEETS—SHEET 1.
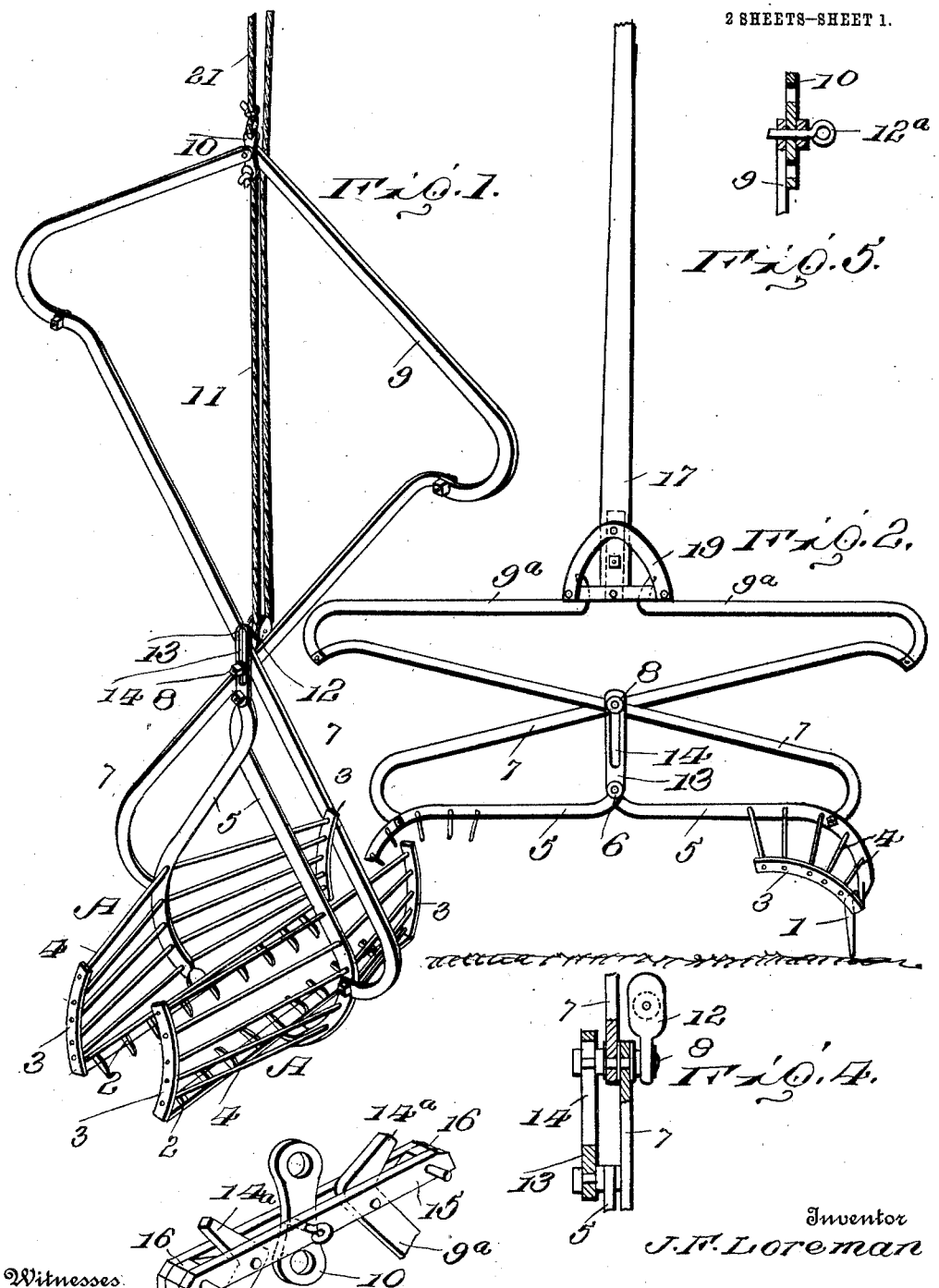
Witnesses
W. N. Woodson
Juana M. Fallin
Inventor
J. F. Loreman
By H. A. Lacey, Attorneys.

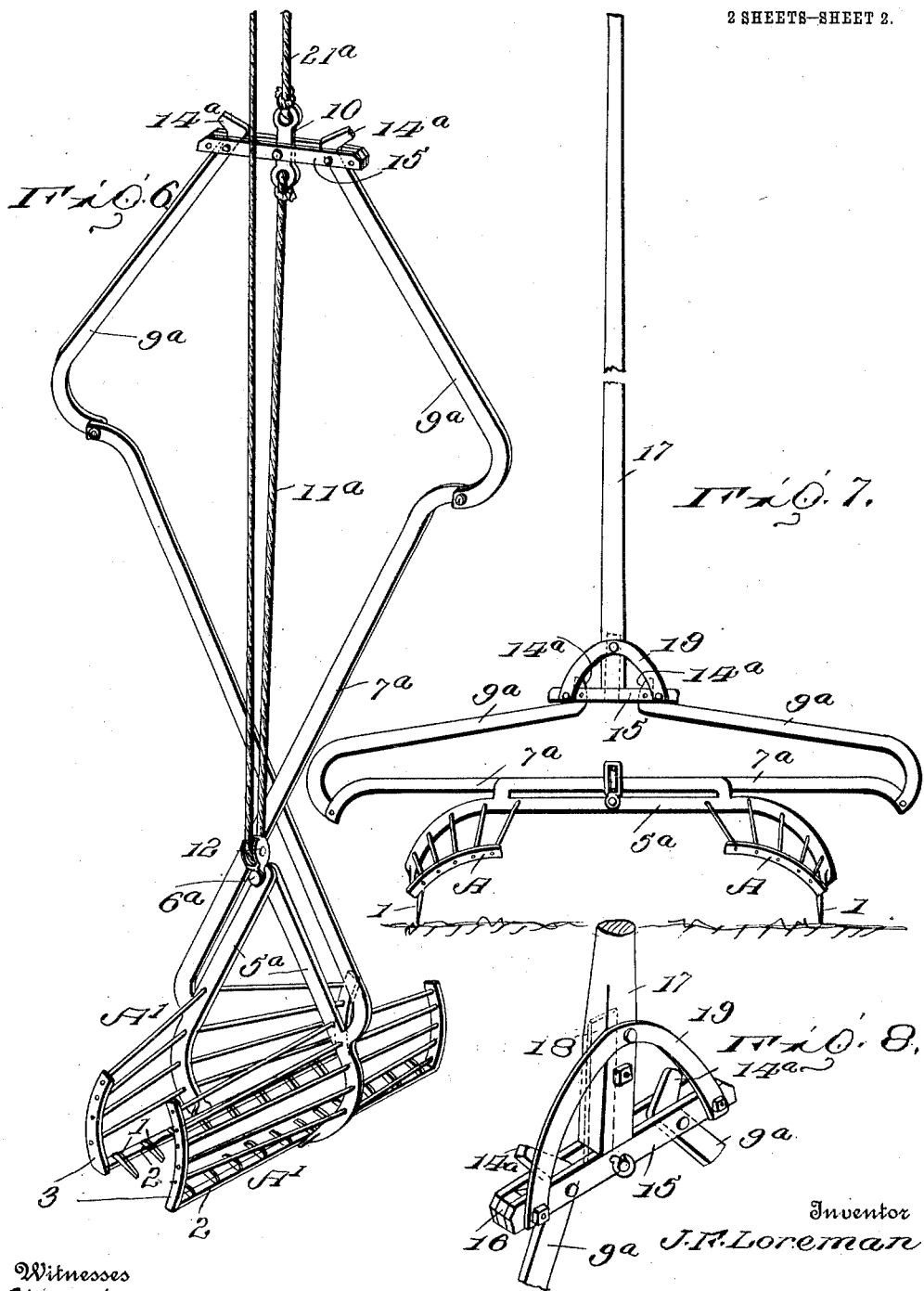

UNITED STATES PATENT OFFICE.

JAMES F. LOREMAN, OF CRISFIELD, MARYLAND.

TONGS.

1,009,760.      Specification of Letters Patent.     Patented Nov. 28, 1911.

Application filed November 28, 1910. Serial No. 594,568.

*To all whom it may concern:*

Be it known that I, JAMES F. LOREMAN, citizen of the United States, residing at Crisfield, in the county of Somerset and State of Maryland, have invented certain new and useful Improvements in Tongs, of which the following is a specification.

This invention comprehends certain new and useful improvements in oyster and clam tongs, and the invention has for its primary object a simple, durable and efficient construction of device of this character, the parts of which are so arranged that they may be easily manipulated, the jaws being capable of an opening movement of considerable extent and being positive and sure in their action when drawn together preparatory to bringing the catch to the surface of the water and depositing it in the boat or any suitable receptacle.

The invention also has for its object improved tongs so arranged that in one embodiment of the device the same may be operated by one hand and without the necessity of the tiresome movements of the arms of the operator that are incidental to the use of the ordinary crossed handle tongs, and which, in another embodiment of the device is particularly adapted for deep water where a handle or pole, or shaft, as it is called in the trade, could not conveniently reach.

The invention also has for its object an improved construction of oyster or clam tongs, the jaws of which may be controlled under water, the invention, in this aspect thereof, embodying cables that are so correlated with the other parts of the tongs that the jaws may be opened and closed by pulling upon one cable or the other. And the invention has for a still further object to generally improve this class of devices and to render them more useful and commercially desirable.

For a full understanding of the invention, reference is to be had to the following description and accompanying drawings, in which:

Figure 1 is a perspective view of one form or embodiment of my invention; Fig. 2 is an elevation of a slightly different form; Fig. 3 is a fragmentary perspective view; Fig. 4 is a detail sectional view; Fig. 5 is an edge view of the link connection between the inner ends of the actuating levers shown in Fig. 1; Fig. 6 is a perspective view of another embodiment of the device; Fig. 7 is a side elevation of another form; and, Fig. 8 is a fragmentary perspective view, illustrating particularly one means of attaching a shaft or handle to the tongs.

Corresponding and like parts are referred to in the following description and indicated in all the views of the drawings by the same reference characters.

In that embodiment of my invention illustrated in Figs. 1 and 2, the jaws A each embody any desired number of spikes or teeth 1 secured to a transversely extending bar 2, the ends of said bar being extended upwardly, as shown at 3, and having the ends of cross rods 4 connected to them. The rods 4 extend through jaw holding arms 5 riveted or otherwise secured at their lower ends to the bars 2, the bars and their rods 4 constituting scoops and the teeth or spikes 1 serving as the raking elements that are generally employed in devices of this class. The arms 5 are pivotally connected together at one end by a bolt 6 or the like and are connected intermediate of their ends to the lower ends of lazy tong members 7, said members crossing each other, as shown and being pivotally connected together intermediate of their ends by a bolt 8 or similar fastening device. The upper ends of the lazy tong members 7 are, as indicated in Fig. 1, pivotally connected to actuating bars 9 which are preferably bowed outwardly where they are connected to the lazy tong members so as to secure a firm purchase and increased leverage on the parts. The inner ends of the bars 9 are overlapped and pivotally connected together, and a link 10 is, in that embodiment of the invention now being described, interposed between the inner ends of the bars and is mounted on the pivot bolt which connects said ends together. A cable 11 is connected at one end to the lowermost eye of the link 10, said cable passing downwardly and around a pulley 12, the casing of which is swiveled on the bolt 8. The cable thence extends upwardly through an eye 12$^a$ secured to the link 10, and is intended to be grasped by one hand of the operator, while a cable 21 connected to the uppermost eye on the link 10 is intended to be grasped by the operator's other hand. It will thus be understood that by drawing down one cable and releasing the tension on the other, the lazy tong members 7 may be moved in opposite directions so as to either open or close the jaws A. In order to prevent the joint between the arms 5 from becoming locked or moving downwardly past the center, I have provided a stop bar 13 which in the present instance is mounted at one end on the bolt 6 and which is formed with a slot 14 accommodating the bolt 8. By this means, the opening movement of the arms 5 is limited by the engagement of one end of the slot 14 with the bolt 8, but the arms are open far enough to permit the pivot pin to move down past the center.

It is manifest that the embodiment of the invention illustrated in Fig. 1 is particularly adapted for use in deep water, where a shaft would be useless, as there is practically no limit to the depth to which the cable operating device may be lowered and operated. It is to be understood, however, that my invention is in no wise limited to the use of the cables, but also comprehends the use of a shaft such as that indicated at 17 in Fig. 2. This shaft may be connected to the actuating bars 9ª, as by spaced cross bars 15 connected together at their ends with interposed blocks 16, a strap 18 and arched brace 19 serving to connect the shaft to the cross bars 15.

In that form of the invention illustrated in Fig. 2, it will be noted that the actuating bars, designated 9ª, are formed with hooked ends 14ª pivotally connected to the cross bars 15 and adapted to engage the blocks 16 when the bars are swung inwardly toward each other to close the jaws, said blocks and hooked ends thereby serving to take some of the strain off of the bolts which pivotally connect the inner ends of the actuating bars 9ª to the cross bars 15.

If desired, a device such as that illustrated in Fig. 2 may be easily converted into a device designed for operation by cables, by merely removing the arched brace 19 and the shaft 17 with its connecting strap 18, and substituting therefor the link 10, as illustrated in Fig. 3, a pulley being attached to the bolt 8.

Fig. 6, illustrates another embodiment of my device. Referring to Fig. 6, A' designates the jaws, 5ª the jaw carrying arms pivotally connected at one end by a bolt 6ª, 7ª designates the lazy tong members which in this form of the invention are not directly connected together by any pivot bolt or other device, and 9ª designates the actuating bars pivotally connected at their inner ends to the cross bars 15. 10 designates the link to which the cables 11ª and 21ª are connected and 12 designates the pulley around which the cable 11ª extends.

Fig. 7, illustrates the same arrangement of free lazy tongs as is illustrated in Fig. 6, but shows these devices as equipped with a shaft 17.

It is to be understood that my invention is not limited to any means for connecting the lazy tong members to the jaw carrying arms, as they may be welded or otherwise secured and that the invention is not limited in any other respects as regards details of construction and arrangement and proportions of the parts, except as defined within the scope of the appended claims.

Having thus described the invention, what is claimed as new is:

1. Tongs for the purpose specified, comprising jaws, lazy tong members connected to said jaws and arranged to open and close the same, actuating bars connected at their outer ends to the upper ends of said lazy tong members, the inner ends of said bars being formed with hooked extremities, cross bars between which the hooked extremities of the actuating bars are pivotally connected, stop blocks secured to the ends of said cross bars and adapted for engagement by the hooked ends of the actuating bars, and a shaft having its lower end inserted in between said cross bars and connected thereto.

2. Tongs for the purpose specified, comprising jaws, lazy tong members connected to said jaws and arranged to open and close the same, actuating bars connected at their outer ends to the upper ends of said lazy tong members, the inner ends of said bars being formed with hooked extremities, cross bars between which the hooked extremities of the actuating bars are pivotally connected, stop blocks secured to the ends of said cross bars and adapted for engagement by the hooked ends of the actuating bars, a shaft having its lower end inserted in between said cross bars and connected thereto, and a brace connected at its ends to one of said cross bars and intermediate of its ends to said shaft.

3. Tongs for the purpose specified, comprising jaws, arms to which said jaws are connected, said arms being pivotally connected together, a slotted bar secured to said arms at the pivot point thereof, lazy tong members operatively connected at their lower ends to said arms, a bolt pivotally connecting said lazy tong members together, the bolt being received in the slot of said bar, actuating bars connected to the upper ends of said lazy tong members, and means connected to said actuating bars for expanding the lazy tong members.

4. Tongs for the purpose specified, comprising jaws, lazy tong members operatively connected to said jaws and arranged to open and close the same, actuating bars connected at their outer ends to the upper ends of said lazy tong members, the inner ends of said bars being formed with hooked extremities, cross bars between which the hooked extremities of the first named bars are pivotally connected, and stop blocks secured to the ends of said cross bars and adapted for engagement by the hooked ends of the actuating bars.

In testimony whereof, I affix my signature in presence of two witnesses.

JAMES F. LOREMAN. [L. S.]

Witnesses:
JOSEPH W. DISHAWEN,
JOHN E. BYRD.

Copies of this patent may be obtained for five cents each, by addressing the "Commissioner of Patents, Washington, D. C."